United States Patent
Song (10) Patent No.: US 8,970,731 B2
(45) Date of Patent: Mar. 3, 2015

(54) METHOD AND APPARATUS FOR CONTROLLING ADAPTIVE EXPOSURE AND IMAGE SENSOR HAVING THE SAME

(75) Inventor: Dong Seob Song, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 391 days.

(21) Appl. No.: 13/491,382

(22) Filed: Jun. 7, 2012

(65) Prior Publication Data

US 2013/0038785 A1 Feb. 14, 2013

(30) Foreign Application Priority Data

Aug. 12, 2011 (KR) .................. 10-2011-0080363

(51) Int. Cl.
*H04N 5/353* (2011.01)
*H04N 5/235* (2006.01)
*H04N 5/3745* (2011.01)

(52) U.S. Cl.
CPC ............. *H04N 5/353* (2013.01); *H04N 5/2353* (2013.01); *H04N 5/3535* (2013.01); *H04N 5/3745* (2013.01)
USPC ..................................................... 348/229.1

(58) Field of Classification Search
None
See application file for complete search history.

(56) References Cited

U.S. PATENT DOCUMENTS

| 7,612,813 B2 * | 11/2009 | Hunter ..................... 348/297 |
| 2007/0177050 A1 | 8/2007 | Xiao et al. |
| 2011/0205406 A1 * | 8/2011 | Gough ..................... 348/256 |

FOREIGN PATENT DOCUMENTS

| KR | 1020010037684 A | 5/2001 |
| KR | 1020057020537 B1 | 4/2004 |
| KR | 1020070078810 A | 8/2007 |
| KR | 1020087009532 B1 | 7/2010 |

* cited by examiner

*Primary Examiner* — Twyler Haskins
*Assistant Examiner* — Angel L Garces-Rivera
(74) *Attorney, Agent, or Firm* — William Park & Associates Patent Ltd.

(57) ABSTRACT

Provided are a method and apparatus for controlling adaptive exposure, and an image sensor including the same. The method includes calculating a pixel saturation level of an entirety of pixels provided within an image frame and resetting a target brightness value according to the pixel saturation level; and controlling an exposure level of the pixels such that pixel brightness values of the pixels are within the target brightness value and a predetermined range.

14 Claims, 6 Drawing Sheets

| 1 | 1 | 1 |
|---|---|---|
| 1 | 4 | 1 |
| 1 | 1 | 1 |

FIG. 6

METHOD AND APPARATUS FOR CONTROLLING ADAPTIVE EXPOSURE AND IMAGE SENSOR HAVING THE SAME

CROSS-REFERENCE TO RELATED APPLICATIONS

This application claims priority to Korean Patent Application No. 10-2011-0080363 filed on Aug. 12, 2011, in the Korean Intellectual Property Office, the disclosure of which is incorporated herein by reference in its entirety.

BACKGROUND OF THE INVENTION

1. Field of the Invention

Embodiments of the present inventive concept relates to a method and apparatus for controlling adaptive exposure, and more particularly, to an image sensor having the same.

2. Description of the Related Art

In general, an adaptive exposure control apparatus may be applied to devices such as a digital camera or a digital camcorder requiring digital image processing technology. The adaptive exposure control apparatus may be used for generating an image having constant brightness according to a change in an external environment. This adaptive exposure control apparatus is provided using an algorithm in which an exposure time of an image sensor and an analog signal amplification rate affecting image brightness are appropriately controlled.

An adaptive exposure control method according to the related art has a defect, in which even when there is a dark region and a bright region present together in a single image, the bright portion of the image may be light saturated in a considerable portion thereof. When an image has a large light saturated portion a dynamic range with regard to image brightness is reduced. Thus, when an image has a large light saturated portion, image degradation may be caused; such a phenomenon may be more serious as a unit pixel size is reduced.

SUMMARY OF THE INVENTION

An embodiment of the present inventive concept provides a method and apparatus for controlling adaptive exposure and an image sensor having the same.

An embodiment of the present inventive concept provides a method of controlling adaptive exposure, the method including: calculating a pixel saturation level of an entirety of pixels provided within an image frame and resetting a target brightness value according to the pixel saturation level; and controlling an exposure level of the pixels such that pixel brightness values of the pixels are within the target brightness value and a predetermined range.

An embodiment of the present inventive concept provides an apparatus for controlling adaptive exposure, including: a target brightness value calculation unit calculating a pixel saturation level of an entirety of pixels provided within an image frame and resetting a target brightness value thereof, according to the pixel saturation level; and an exposure level control unit controlling an exposure level of the pixels such that pixel brightness values of the pixels are within the target brightness value and a predetermined range.

An embodiment of the present inventive concept provides an image sensor including: a pixel array including a plurality of unit pixels and converting an optical image of a subject into an electrical signal; a circuit device amplifying the electrical signal converted in the pixel array and converting the amplified signal into a digital signal to thus extract an image frame of the subject; and an adaptive exposure control apparatus calculating a pixel saturation level of an entirety of pixels of the image frame extracted from the circuit device, resetting a target brightness value according to the calculated pixel saturation level, and controlling an exposure level of the pixels to allow a pixel brightness values of the pixels to be within the target brightness value and a predetermined range.

BRIEF DESCRIPTION OF THE DRAWINGS

The above and other aspects, features and other advantages of the present inventive concept will be more clearly understood from the following detailed description taken in conjunction with the accompanying drawings, in which.

DETAILED DESCRIPTION OF THE INVENTION

Embodiments of the present inventive concept will now be described in detail with reference to the accompanying drawings such that they could be easily practiced by those having skill in the art to which the embodiment of the present inventive concept pertains. However, in describing the embodiments of the present inventive concept, detailed descriptions of well-known functions or constructions will be omitted so as not to obscure the description of the present inventive concept with unnecessary detail.

In addition, like reference numerals denote like elements throughout the drawings.

Unless explicitly described to the contrary, the word "comprise" and variations such as "comprises" or "comprising," will be understood to imply the inclusion of stated elements but not the exclusion of other elements.

Figure 1:
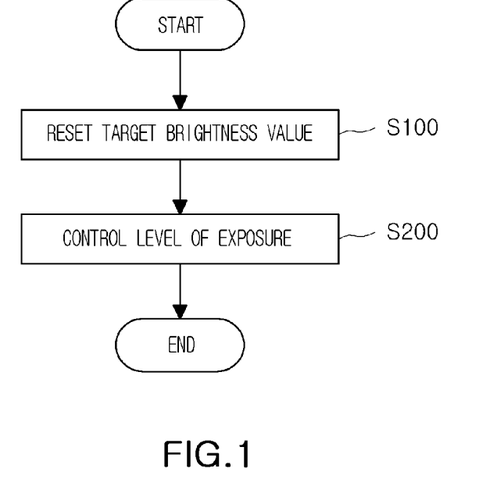
FIG. 1 is a block diagram showing a method of controlling adaptive exposure.

FIG. 1 is a block diagram showing a method of controlling adaptive exposure.

With reference to FIG. 1, a method of controlling adaptive exposure may include resetting a target brightness value thereof (S100) and controlling an exposure level (S200).

Hereinafter, a method of controlling adaptive exposure will be described with reference to FIG. 1.

Resetting of the target brightness value (S100) may be performed to calculate a saturated pixel rate among the entirety of pixels provided within an image frame. The target brightness value may be reset according to a calculated saturated pixel rate.

In general, exposure may be controlled by obtaining a difference between a predetermined target brightness value and pixel brightness values of pixels comprising an image frame. The obtained difference may be compensated by a difference level thereof.

A pixel brightness value deviation within an entire image frame that is relatively great, however, may cause a defect in which a considerable portion of a bright region within the image frame is saturated. This defect may be caused for example, in a bright external environmental image, when the exposure control is performed by a single fixed target brightness value.

Therefore, resetting of the target brightness value (S100) may be performed by resetting the target brightness value thereof based on a saturation rate of the pixels. The bright region of the image may be prevented from being saturated by performing the resetting of the target brightness value (S100), and thus a relatively high dynamic range may be secured.

The target brightness value may be initially set as an average brightness value of the entirety of the pixels comprising an image frame. The average brightness value may be an average of all the pixels within an image frame, but the average brightness value may also be an average brightness value of a sample of some pixels that are sampled at a predetermined interval. When the average brightness value is calculated by using the sampled pixels, a difference between the average brightness value of some sampled pixels and the average brightness value obtained from the entirety of the pixels may be relatively low. Calculating just a sample of all the pixels, however, may significantly reduce the amount of calculations needed to obtain the average brightness value.

Resetting the target brightness value (S100) may be provided such that it may only be performed when the image frame is an outdoor image (or it may not be performed when the image frame is an indoor image) because saturation in a considerable portion of the pixels is generally generated when a strong light source, such as the sun, is present. In order to determine whether or not the image is an outdoor image, an International Organization for Standard (ISO) sensitivity value may be used. In general, when a strong light source such as the sun is present, photography may be mainly performed by setting the ISO sensed value to be relatively low. Indoors, photography may be mainly performed by setting the ISO sensed value to be relatively high. Therefore, the resetting of the target brightness value (S100) may be performed by using the ISO sensed value when the ISO sensed value is lower than a predetermined ISO threshold value.

Controlling of the exposure level (S200) may be performed by controlling an exposure level of the pixels such that the pixel brightness values are within the target brightness value and a predetermined range.

Here, in the controlling of the exposure level (S200), an exposure level of the pixels may be controlled by controlling at least one of an integration time of the pixels and an analog signal amplification rate.

Since the pixel brightness values are determined by an exposure level of the pixels exposed to light, the exposure level of the pixels may be controlled such that the pixel brightness values are controlled to be within the target brightness value and the predetermined range.

The exposure level of the pixels may be controlled by controlling an integration time of pixels, or by controlling an amplification level of an electrical signal corresponding to light input to the pixels. In detail, the integration time of the pixels may be controlled by an on/off operation of a switch provided between a photodiode configuring the pixels and a ground. The amplification level of the electrical signal may be controlled by controlling an amplification rate of an analog signal applied for the amplification of the electrical signal.

Figure 2:
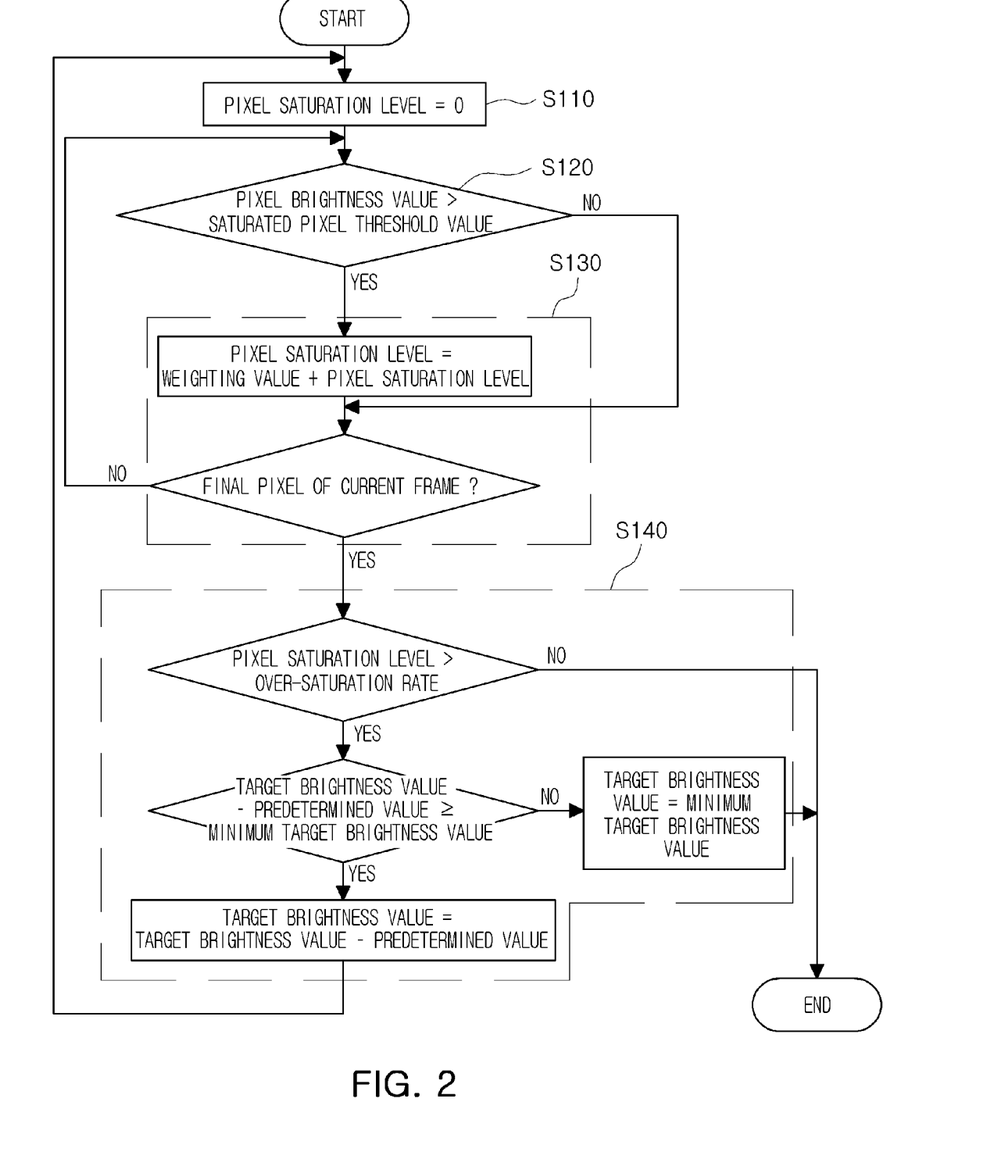
FIG. 2 is a flowchart showing a target value resetting operation in the method of controlling adaptive exposure.

FIG. 2 is a flowchart showing a target value resetting operation in a method of controlling adaptive exposure.

With reference to FIG. 2, resetting of the brightness target value (S100) in the method of controlling adaptive exposure may include initializing a pixel saturation level (S110), determining whether a saturation pixel threshold is exceeded (S120), calculating a pixel saturation level (S130) and controlling a target brightness value (S140).

Hereinafter, the resetting of the target brightness value (S100) in the method of controlling adaptive exposure will be described with reference to FIG. 2.

In the initializing of the pixel saturation level (S110), a pixel saturation level may be initialized. The pixel saturation level may be used to determine whether the image frame is in an over-saturation state.

The pixel saturation level may be used to determine whether the image frame is in an over-saturation state through comparison with an over-saturation rate in the controlling of the target brightness value (S140). In particular, if the pixel saturation level is greater than the over-saturation rate, the image frame is in an over-saturation state. Thus, the pixel saturation level may first be initialized in order to determine whether the image frame is in an over-saturation state. The above-mentioned initialization may be performed by setting the pixel saturation level to be 0.

A brightness value of a pixel (pixel brightness value) is compared with a saturation pixel threshold, if the pixel brightness value exceeds the saturation pixel threshold the pixel is set to be a saturated pixel.

The saturation pixel threshold value may be a predetermined value, and it can be appreciated whether respective pixels comprising an image frame were saturated based on the saturation pixel threshold value. Here, the saturation pixel threshold value may be 255, based on 8 bits.

Therefore, each pixel brightness value may be compared with the saturation pixel threshold value and when the pixel brightness value is greater than the saturation pixel threshold value, the pixel may be determined to have been saturated.

In calculating the pixel saturation level (S130), a weighting value corresponding to the saturated pixel may be accumulated or added to the pixel saturation level.

Respective pixels may have corresponding weighting values. Therefore, weighting values of saturated pixels obtained in the determining of the saturated pixel (S120) comprising an image may be added to the pixel saturation level.

As shown in FIG. 2, the determining of the saturated pixel (S120) and the calculating of the pixel saturation level (S130) may be performed with regard to the entirety of the pixels configuring the image frame. Therefore, of the entirety of the pixels comprising the image frame, weighting values of pixels corresponding to saturated pixels may be accumulated with the pixel saturation level. Thus the pixel saturation level may comprise a total of the weighting values of the saturated pixels comprising an image frame.

The number of pixels in the entire image frame may be determined, and of the entirety of pixels, a weighting value may be only accumulated with regard to a saturated pixel. Thus, the determining of the saturated pixel (S120) and the calculating of the pixel saturation level (S130) may correspond to calculating the saturated pixel rate in resetting of the target brightness value (S100).

Here, in the calculating of the pixel saturation level (S130), the image frame may be divided into two or more sub-regions to thus set a weighting value per sub-region, and an identical weighting value may be provided to pixels pertaining to the same sub-region. That is, each sub-region may have its own weighting value.

Here, the weighting value may have a maximum weighting value in a sub-region located in the center of the image frame.

Figure 6:
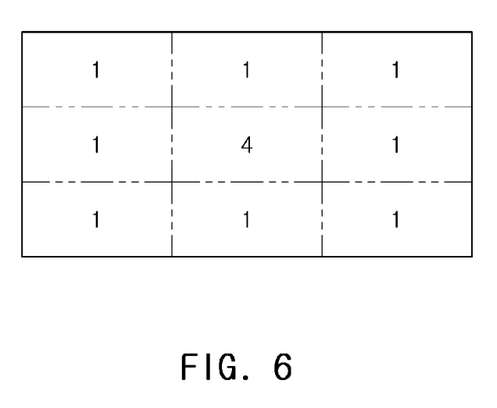
FIG. 6 shows an example in which a weighting value is provided per sub-region in an adaptive exposure control.

For example, the sub-region may be divided into 3×3 regions, namely, 9 regions, as shown in FIG. 6. Since a brightness value of a pixel is actually stored in a memory, the sub-region in the entire image frame may be divided by a memory address containing each pixel brightness value.

In addition, as shown in FIG. 6, respective sub-regions may have different weighting values. A sub-region to which the weighting value is relatively greatly applied may be determined to have a saturation rate higher than normal. Therefore, the sub-region having a high saturation rate as compared with an average case may secure a relatively wide dynamic range with respect to saturation as compared with other sub-regions.

As shown in FIG. 6, when a large weighting value is applied or assigned to a central region of the image frame, as compared with the vicinity thereof, since a relatively wide dynamic range with regard to the central region can be obtained, various levels of brightness with respect to the central region may be represented and a relatively high quality image with respect to the central region may be obtained.

Thus, weighting values per sub-region may be optionally selected by a user or set to be different, according to a predetermined mode in consideration of an image frame characteristic to be obtained.

For example, in the case of an image of a person, a large weighting value may be applied to the central region, and in the case of scenery, weighting values may be evenly set across the entirety of sub-regions.

In the controlling of the target brightness value control (S140), when the pixel saturation level is higher than an over-saturation rate, the target brightness value may be reduced by a predetermined value and then reset to be the above-mentioned target brightness value.

The over-saturation rate is a predetermined value and may be a standard for determining whether the image frame is in an over-saturation state. That is, when the pixel saturation level of the image frame is higher than the over-saturation rate, the image frame is in the over-saturation state.

When the image frame is in the over-saturation state, the target brightness value may be reduced by a predetermined value to thus reset a target brightness value. Even when the image frame is in an over-saturation state, when the target brightness value is used as it is without controlling the target brightness value, pixels saturated within the image frame may become excessive. As the number of saturated pixels increases, a dynamic range of an image may be reduced and image degradation may be caused. Accordingly, brightness in an entire image frame may be lowered and the number of saturated pixels may be decreased by reducing the target brightness value, thus controlling an exposure level of pixels using a reset target brightness value.

Here, in the controlling of the target brightness value (S140), even in a case in which the pixel saturation level is higher than the over-saturation rate, when the target brightness value is lower than a minimum target brightness value, the minimum target brightness value may be set to be the target brightness value.

As shown in FIG. 2, the controlling of the target brightness value (S140) may be repetitively performed until the pixel saturation level becomes lower than or equal to an over-saturation rate. Accordingly, the target brightness value may be gradually lowered.

Here, for example, when the target brightness value is reduced to a predetermined level or lower, the brightness of the entire image frame may be excessively dark.

Even in a case in which adaptive exposure control is applied, the brightness of an entire image may need to be maintained at a level higher than a predetermined level. Therefore, a minimum possible value in the target brightness value may be required. That is, when the target brightness value is lower than a minimum target brightness value, the minimum target brightness value may be set to be the target brightness value such that a minimum value of the target brightness value may be restricted.

Thus the exposure level of the pixels comprising a frame may be controlled so that pixel brightness values are within or below the target brightness value, and within the predetermined range. In other words, the exposure level of the pixels comprising a frame may be controlled by adjusting the target brightness value based on an over-saturation rate of the frame. If the pixel saturation level—as calculated through the pixel brightness value—exceed the over-saturation rate, the target brightness value is reduced a lower predetermined amount. If, however, the reduced target brightness value is below the minimum target brightness value, the target brightness value is set to the minimum target brightness value. Otherwise, the target brightness value is set to the reduced target brightness value and it is again determined whether the pixel saturation level of the frame exceeds the over-saturation rate. This continues until either the pixel saturation level does not exceed the over-saturation rate, or the target brightness value is reduced to the minimum target brightness value.

Figure 3:
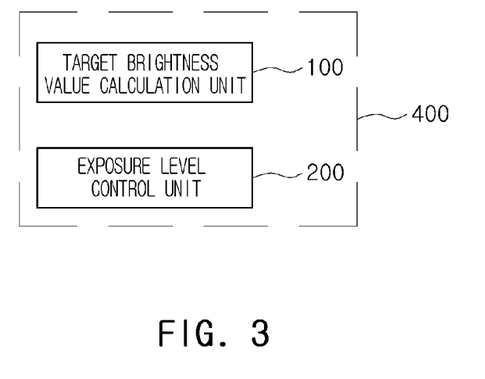
FIG. 3 is a functional block diagram of an apparatus for controlling adaptive exposure.

FIG. 3 is a functional block diagram of an apparatus for controlling adaptive exposure.

With reference to FIG. 3, an adaptive exposure control apparatus 400 may include a target brightness value calculation unit 100 and an exposure level control unit 200.

Hereinafter, the adaptive exposure control apparatus 400 will be described with reference to FIG. 3. It is to be understood that the target brightness value calculation unit 100 and the exposure level control unit 200 may perform any of the functions of their subcomponents.

The target brightness value calculation unit 100 may calculate a saturated pixel rate of saturated pixels among an entirety of pixels within an image frame and reset the target brightness value according to the calculated saturated pixel rate.

Here, the target brightness value calculation unit 100 may include a pixel saturation level calculator and a target brightness value determiner.

The exposure control may be generally performed by a method in which a difference between a predetermined target brightness value and a brightness value of pixels comprising an image frame is first obtained and then the difference thereof is compensated by a difference level.

However, when a brightness value deviation of pixels within the entire image frame is relatively great, for example, in the case of a bright external environmental image, when exposure control is performed with reference to a single fixed target brightness value, a defect in which a considerable portion of a bright region in the image is saturated may be caused.

Here, the target brightness value may first be set as an average brightness value of the entirety of the pixels comprising the image frame, and then, the target brightness value may be reset.

The pixel saturation level calculator may set a pixel having a pixel brightness value higher than a saturation pixel threshold value among pixels comprising the image frame to be a saturated pixel, and may accumulate a weighting value corresponding to the saturation pixel to the pixel saturation level.

The pixel saturation level may be used to determine whether the image frame is in an over-saturation state. Thus, in order to determine whether the image frame is in an over-saturation state, the pixel saturation level may be required to be initialized. Here, the initialization may be performed by a method in which the pixel saturation level is set to be 0.

The pixel saturation level calculator may perform a comparison with the saturation pixel threshold value with respect to the entirety of pixels configuring the image frame to thus accumulate the weighting value.

The saturation pixel threshold value may be a predetermined value, and the saturation pixel threshold value may be 255, based on 8 bits.

The pixel saturation level calculator may set a weighting value per sub-region by dividing the image frame into two or more sub-regions and provide an identical weighting value to a pixel pertaining to the same sub-region.

Here, the weighting value may have a maximum weighting value in a sub-region located in the center of the image frame.

A description for the afore-described sub-region division and weighting value setting will be omitted below.

The target brightness value determiner may reduce the target brightness value by a predetermined value when the pixel saturation level is higher than that of an over-saturation rate, and may set the reduced target brightness value to be the target brightness value.

The target brightness value determiner may set a minimum target brightness value to be the target brightness value when the target brightness value, reduced by the predetermined value, is less than or equal to the minimum target brightness value. If the reduced target brightness value is below the minimum target brightness value, the target brightness value determiner may set target brightness value to the minimum target brightness value even when the pixel saturation level is higher than that of the over-saturation rate.

Since the target brightness value setting and the minimum value setting from the target brightness value are described above, a detailed description thereof will be omitted below.

The exposure level control unit 200 may control an exposure level of the pixels to allow pixel brightness values of the pixels to be within the target brightness value and a predetermined range.

Here, the exposure level control unit 200 may control at least one of an integration time of the pixel and an analog signal amplification rate to control an exposure level of the pixel.

Since the exposure level control of the pixels is described above, a description thereof will be omitted below.

Figure 4:
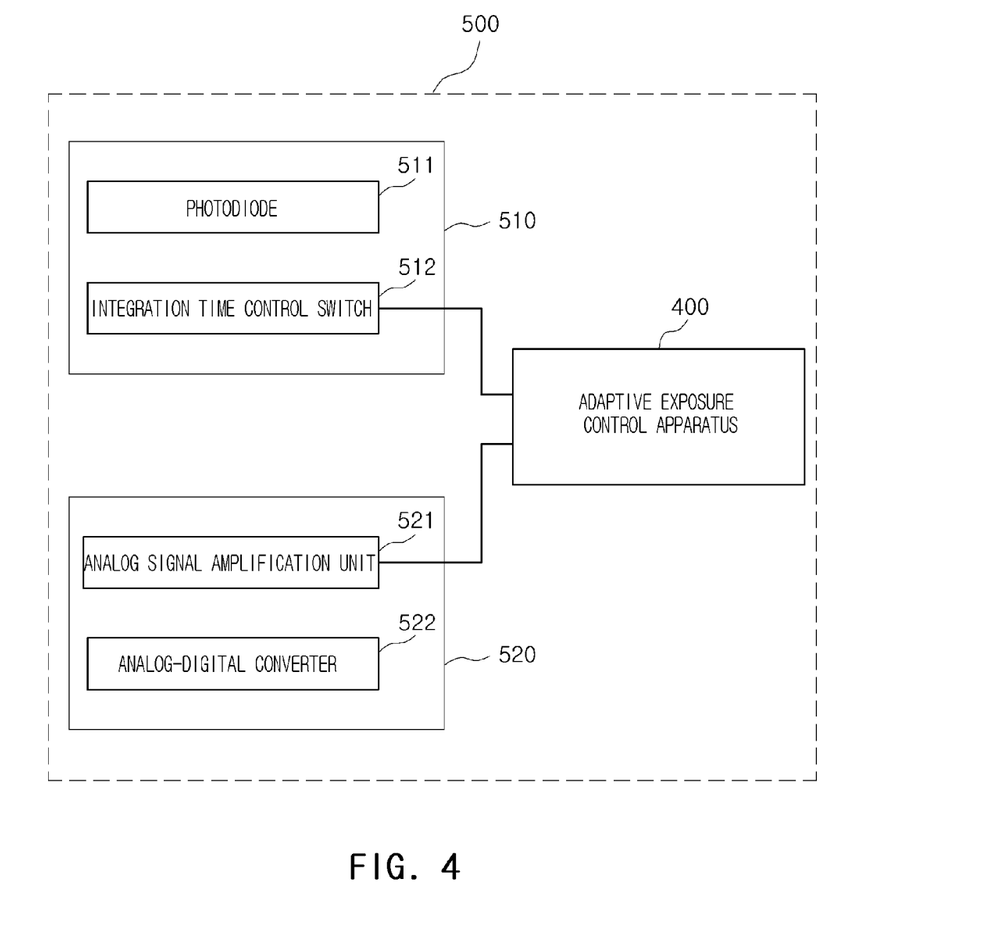
FIG. 4 is a functional block diagram of an image sensor including an adaptive exposure control apparatus.

FIG. 4 is a functional block diagram of an image sensor including an adaptive exposure control apparatus.

With reference to FIG. 4, an image sensor 500 including an adaptive exposure control apparatus may include a pixel array 510, a circuit device 520, and an adaptive exposure control apparatus 400.

The image sensor 500 including an adaptive exposure control apparatus will be described with reference to FIG. 4.

The pixel array 510 may include a plurality of unit pixels and convert an optical image of a subject into an electrical signal. The pixel array 510 may be provided to include two-dimensional planes configured of unit pixels and may include a photodiode 511 and an integration time control switch 512.

The unit pixels configuring the pixel array 510 may have a 4-tr structure, and may be implemented by various methods such as 2-tr, 3-tr, or the like.

The integration time control switch 512 may be connected in parallel between the photodiode 511 and a ground. Turning on/off of an electrical signal generated to correspond to light input by the photodiode 511 may be determined according to a turning on/off of the integration time control switch 512.

Since the level of exposure of pixels to light is determined by turning on/off of the electrical signal, the integration time of the pixel may be controlled by the turning on/off of the integration time control switch 512.

Figure 5A:
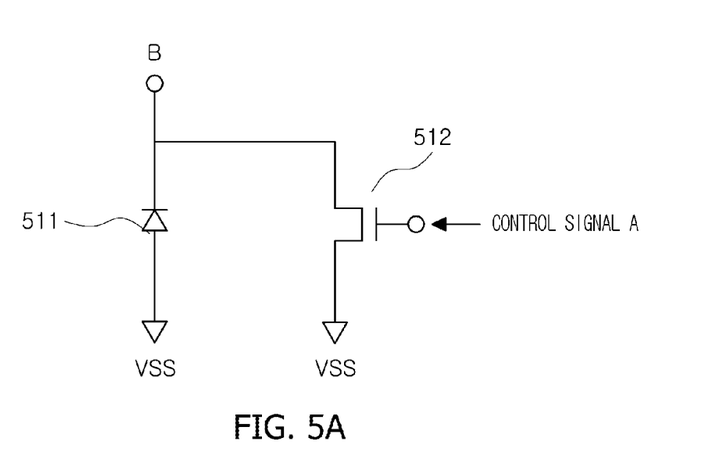
FIGS. 5A to 5B are a diagram and a timing diagram schematically showing an integration time control switch and its operation, respectively.

For example, as shown in FIG. 5A, the integration time control switch 512 may be implemented as a switching transistor, and a switching operation of the transistor may be controlled in response to a control signal A from the adaptive exposure control apparatus 400, the control signal A being input to the switching transistor as a gate voltage thereof.

That is, when the control signal A has a relatively high voltage level, the transistor may operate as a short circuit, and when the control signal A has a relatively low voltage level, the transistor may operate as an open circuit, from which the transistor may be utilized as a switch.

Figure 5B:
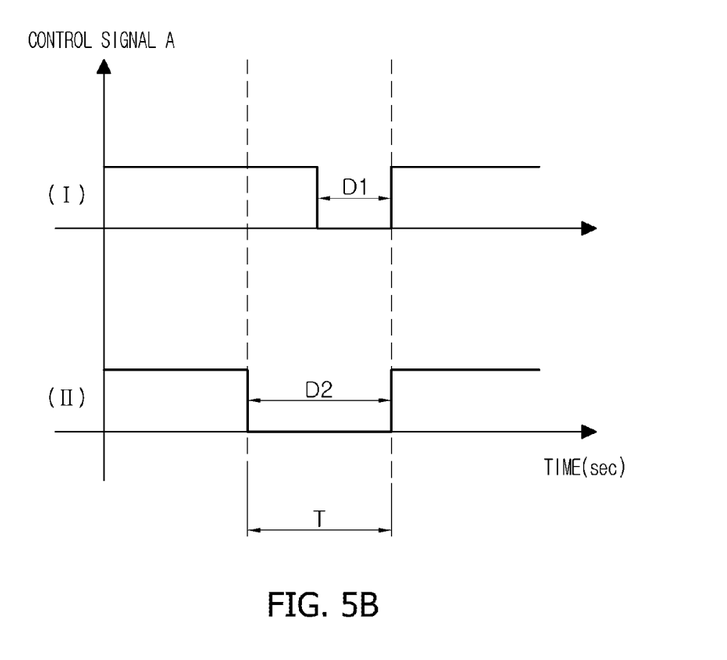

In the case of FIG. 5B (I), during the time D1, in which the control signal A is maintained at a low voltage level, the switching transistor may operate as an open circuit. Accordingly, optical electrons corresponding to light input to the photodiode 511 may be output through a node B.

In the case of FIG. 5B (II), since a time D2, in which the control signal A is maintained at a low voltage level, continues for approximately twice as long as compared with that in the case of (I), the switching transistor may operate as an open circuit for a relatively prolonged time, and accordingly, optical electrons output from the photodiode through the node B may be relatively increased.

Therefore, as compared to the case of (I), the case of (II) may have a relatively prolonged integration time such that an exposure level of pixels may increase.

The circuit device 520 may amplify an electrical signal converted in the pixel array 510 and convert the converted electrical signal into a digital signal, such that an image frame may be extracted from the subject.

The circuit device 520 may include an analog signal amplification unit 521 and an analog-digital converter 522. The analog signal amplification unit 521 may control an analog signal amplification rate for the amplification of the electrical signal output from the pixel array in response to a control signal transmitted from the adaptive exposure control apparatus 400. By controlling the analog signal amplification rate, effects the same as those in the case of a change in the exposure level of a pixel may be obtained.

The adaptive exposure control apparatus 400 may be identical to the afore-mentioned adaptive exposure control apparatus described in relation to FIG. 3. The adaptive exposure control apparatus 400 may transmit a control signal controlling at least one of an integration time of a unit pixel and an analog signal amplification rate of the circuit device.

The adaptive exposure control apparatus 400 may control turning on/off of the integration time control switch 512 by transmitting a control signal with regard to a unit pixel including the integration time control switch 512 connected in parallel between the photodiode 511 and a ground. An integration time of the unit pixel may be controlled according to a turning on/off time of the integration time control switch 512.

In addition, the adaptive exposure control apparatus 400 may control the analog signal amplification rate by transmitting a control signal with regard to the circuit device 520, including the analog signal amplification unit 521 amplifying an electrical signal extracted from the pixel array 510, according to a predetermined analog signal amplification rate, and an exposure level of the unit pixel may be controlled according to the analog signal amplification rate.

As set forth above, according to embodiments of the present inventive concept, a method and apparatus for controlling adaptive exposure, and an image sensor having the adaptive exposure control apparatus, may adaptively control exposure of a pixel according to an input image frame. Accordingly, a dynamic range with respect to brightness may be increased and quality of an image may be improved.

While the present inventive concept has been shown and described in connection with the embodiments in the embodiments, it will be apparent to those skilled in the art that modifications and variations can be made without departing from the spirit and scope of the invention as defined by the appended claims.

What is claimed is:

1. A method of controlling adaptive exposure, the method comprising:

calculating a pixel saturation level of pixels among an entirety of pixels provided within an image frame and resetting a target brightness value according to the pixel saturation level; and controlling an exposure level of the pixels such that pixel brightness values of the pixels are within the target brightness value and a predetermined range, wherein the resetting of the target brightness value includes:

initializing the pixel saturation level to determine whether the image frame is in an oversaturation state;

determining a saturated pixel, by setting a pixel having a pixel brightness value greater than a saturation pixel threshold value among the pixels comprising the image frame, to be the saturated pixel;

calculating the pixel saturation level by integrating a weighting value corresponding to the saturated pixel to the pixel saturation level; and controlling the target brightness value by reducing the target brightness value by a predetermined amount when a pixel saturation value is greater than that of an oversaturation rate to arrive at a reduced target brightness value, and then, setting the reduced target brightness value to be the target brightness value.

2. The method of claim 1, wherein the controlling of the target brightness value includes setting a minimum target brightness value to be the target brightness value, when the reduced target brightness value is smaller than the minimum target brightness value.

3. The method of claim 1, wherein calculating of the pixel saturation level includes dividing the image frame into two or more sub-regions, setting a weighting value per the sub-region, and providing a same weighting value to a pixel pertaining to the same sub-region.

4. The method of claim 3, wherein the weighting value has a maximum weight value on the sub-region located on the center of the image frame.

5. The method of claim 1, wherein the controlling of the exposure level is performed to control the exposure level of the pixel by controlling at least one of an integration time of the pixel and an analog signal amplification rate.

6. An apparatus for controlling adaptive exposure, comprising:

a target brightness value calculation unit calculating a pixel saturation level of pixels among an entirety of pixels provided within an image frame and resetting a target brightness value thereof, according to the pixel saturation level; and an exposure level control unit controlling an exposure level of the pixels such that pixel brightness values of the pixels are within the target brightness value and a predetermined range, wherein the target brightness value calculation unit includes:

a pixel saturation level calculator setting a pixel, having a pixel brightness value greater than a saturation pixel threshold value among the pixels configuring the image frame, to be the saturated pixel, and integrating a weighting value corresponding to the saturated pixel to the pixel saturation level; and a target brightness value determiner reducing the target brightness value by a predetermined value when the pixel saturation level is higher than that of an oversaturation rate, and then to arrive at a reduced target brightness value, and setting the reduced target brightness value to be the target brightness value.

7. The apparatus of claim 6, wherein the target brightness value determiner sets a minimum target brightness value to be the target brightness value, when the reduced target brightness value is smaller than the minimum target brightness value.

8. The apparatus of claim 6, wherein the pixel saturation level calculator divides the image frame into two or more sub-regions, sets the weighting value per sub-region, and provides an identical weighting value to a pixel pertaining to the same sub-region.

9. The apparatus of claim 8, wherein the weighting value of a maximum weight value on the sub-region located on the center of the image frame.

10. The apparatus of claim 6, wherein the exposure level control unit controls an exposure level of the pixel by controlling at least one of an integration time of the pixel and an analog signal amplification rate.

11. An image sensor comprising:

a pixel array including a plurality of unit pixels and converting an optical image of a subject into an electrical signal;

a circuit device amplifying the electrical signal converted in the pixel array and converting the amplified signal into a digital signal to thus extract an image frame of the subject; and an adaptive exposure control apparatus calculating a pixel saturation level of pixels among an entirety of pixels of the image frame extracted from the circuit device, resetting a target brightness value according to the calculated pixel saturation level, and controlling an exposure level of the pixels to allow a pixel brightness values of the pixels to be within the target brightness value and a predetermined range, wherein the adaptive exposure control apparatus setting a pixel, having a pixel brightness value greater than a saturation pixel threshold value among the pixels configuring the image frame, to be the saturated pixel, and integrating a weighting value corresponding to the saturated pixel to the pixel saturation level; and reducing the target brightness value by a predetermined value when the pixel saturation level is higher than that of an oversaturation rate, and then to arrive at a reduced target brightness value, and setting the reduced target brightness value to be the target brightness value.

12. The image sensor of claim 11, wherein the adaptive exposure control apparatus transmits a control signal controlling at least one of an integration time of the unit pixel and an analog signal amplification rate of the circuit device to thus control the exposure level of the pixel.

13. The image sensor of claim 12, wherein the unit pixel includes an integration time control switch connected in parallel between a photodiode and a ground, and the adaptive exposure control apparatus transmits the control signal to the integration time control switch to control turning on/off of the integration time control switch and controls the integration time of the unit pixel according to a turning on/off time of the integration time control switch.

14. The image sensor of claim 13, wherein the circuit device includes an analog signal amplification unit amplifying an electrical signal extracted from the pixel array according to a predetermined analog signal amplification rate, and the adaptive exposure control apparatus transmits the control signal to the analog signal amplification unit to thus control the analog signal amplification rate and controls an exposure rate of the unit pixel according to the analog signal amplification rate.

\* \* \* \* \*